Figures 2, 3:
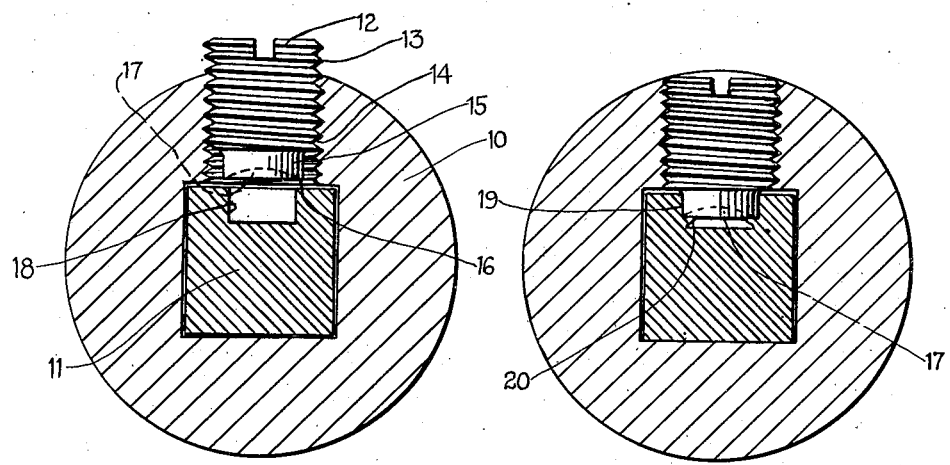

Jan. 9, 1940.   G. E. JOHNSTON   2,186,678
KNOB SECURING MEANS
Filed Oct. 19, 1935

George E. Johnston
INVENTOR
BY
A. H. Golden
ATTORNEY

Patented Jan. 9, 1940

2,186,678

UNITED STATES PATENT OFFICE 2,186,678

KNOB SECURING MEANS

George E. Johnston, Stamford, Conn., assignor to The Yale & Towne Manufacturing Company, Stamford, Conn., a corporation of Connecticut Application October 19, 1935, Serial No. 45,744

6 Claims. (Cl. 292—350)

This invention relates to means for securing a knob to a spindle, utilizing a special form of screw adapted for special cooperation with the spindle.

One of the most troublesome problems in the assembly of knobs and spindles involves the securing of a knob to a spindle by means which will hold properly over long periods of time. This problem has been attacked many times, and there are scores of patents showing many forms and types of screws cooperating with different types of spindles and knobs. All such screws, and means for utilizing them, as have heretofore been devised have had one or more undesirable features.

One of the most important features which is necessary in a screw fastening combination, is means for preventing the loosening of the screw which holds the knob, by the vibration incidental to the continuous rotation of the knob in service. My invention solves this rather long standing problem by very simple but effective means.

In general, my invention embodies a screw having a screwthreaded portion and a cutting end. The screw threaded portion lies in the knob, while the cutting end is adapted to engage the spindle and preferably enter a specially prepared opening in the spindle, so that as the screw is driven home through means of its threads, the cutting end cuts away, preferably, a portion of the wall of the specially prepared opening in the spindle. This cutting away of the wall of the opening in the spindle sets up a decided friction between the wall and the cutting end of the screw. This cutting serves also to build up material under the cutting end of the screw, which material is really in the form of a resilient shoulder pressing upwardly against the screw.

This resilient pressure tending to press the screw upwardly or outwardly from the spindle opening, reacts against the screw threads and sets up a resistance tending to prevent rotation of the screw in a direction required to release the knob from the spindle. Resilient pressure between the wall of the opening cut away by the cutting end of the screw also reacts with the screw in a somewhat similar manner.

While I shall hereinafter show a particular form of screw embodying the main features of my invention, and a particular spindle cooperable therewith, I do not wish to be limited in the monopoly granted me to the mere form of the invention disclosed herein. Rather, I believe I am entitled to relatively broad claims to be given a relative broad interpretation, so that it will be impossible for anyone to utilize the basic contribution of my invention without infringing the terms of the claims setting forth the invention.

Figures 4, 5:
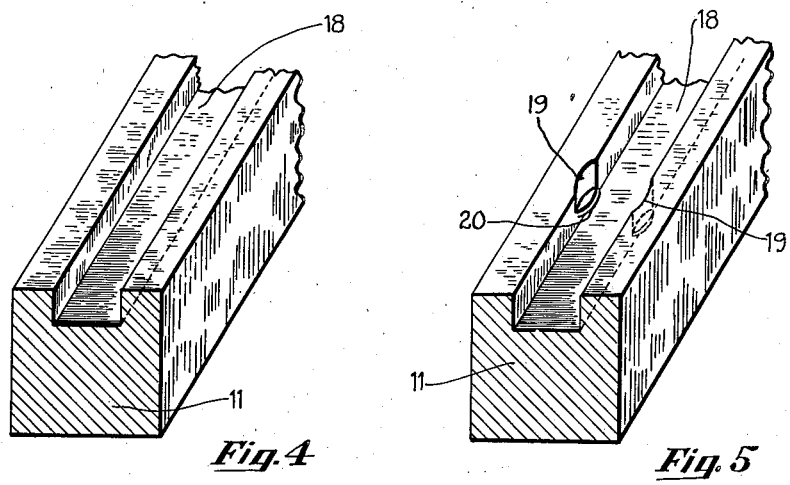
Figure 1:
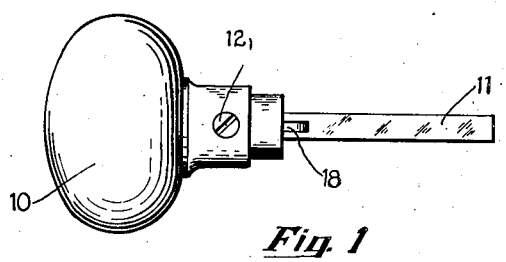

Referring now to the drawing, Fig. 1 illustrates an assembly of a knob and spindle. Fig. 2 is a section through the knob and spindle showing the relation of the fastening screw thereto before it is driven home, while Fig. 3 is a similar section showing the fastening screw driven home. Fig. 4 is a perspective view of the spindle before the screw has cut into the slot thereof, while Fig. 5 is a similar view showing the relation of the parts when the screw has cut into the slot.

Referring now more particularly to the drawing, reference numeral 10 represents a usual commercial form of knob, while reference numeral 11 indicates a usual commercial form of spindle secured to the knob by a fastening screw 12. The screw 12 is screw threaded as at 13 for cooperation with a threaded bore 14 in the knob 10. The screw has a cutting end 15 terminating in a cutting edge 16, the end surface of the cutting end being concave as at 17 in order to produce better cutting by the edge 16. The spindle 11 has a slot 18 formed therein which is slightly narrower than the diameter of the cutting end 15 of the screw 12. Of course, I could use some other form of opening instead of the slot 18, as, for instance, a mere circular bore smaller in diameter than the cutting end of the screw. Similarly, I could use transverse or other slots in the spindle.

The particular relation between the cutting end 15 of the screw 12 and the spindle, which forms the basic and important feature of my invention, is the arrangement of a surface of the spindle, as of a slot or opening, relatively to which the cutting screw may be rotated for cutting away at least part of the said surface, whereby to set up the pressures to be referred to presently.

The action of the cutting end 15 of the screw is well shown in Fig. 3 wherein it will be observed that the screw will cut away a portion 19 of the wall surface of the slot, and will gradually build up a resilient shoulder 20 of the cutaway material, which resilient shoulder will extend against the concave surface 17 of the screw. The exact shape of the cut made by the screw may well be seen from viewing Fig. 5, which shows the spindle with the cutting screw removed after the cutting has taken place.

The friction established between the cutaway wall portion 19 of the slot 18 and the surface 15 of the screw will naturally tend greatly to prevent reverse or release rotation of the screw. Similarly, the pressure of the relatively resilient shoulder 20 against the end surface 17 of the screw will set up an outward pressure between the threads 13 of the screw and the threaded surface 14 of the knob, so as to resist at this point also the release rotation of the screw. As a matter of fact, the coaction between the cut-away wall portion 19 and the surface 15 of the screw will also be such as to apply an upward pressure similar to that applied by shoulder 20. In this way, the tendency of the screw to move outwardly through reverse rotation is overcome.

My invention as just described has been embodied in various successfully operating structures, and has been given a considerable number of commercial tests which have proven my invention to be of especial utility and value in this field. Of course, the basic principles underlying the invention may, it is reiterated, be embodied in many varying forms.

I now claim:

1. In combination, a spindle having a groove, a knob mounted on said spindle, a fastening screw threaded in said knob and terminating in a cutting end slightly greater in diameter than the width of said groove, said screw when rotated home being adapted to have its cutting end cut away sectors of metal from the walls of said groove, whereby to set up increasing pressure between the walls of the groove and said screw, resisting the retraction of the screw.

2. In combination, a spindle having an opening, a knob mounted on said spindle, a fastening screw threaded in said knob and terminating in a cutting end, the said cutting end being offset at least partially relatively to said opening, said screw when rotated home being adapted to have its cutting end cut away a sector of metal from the opening, whereby to set up increasing pressure between the screw and the metal against which it is cutting, the said pressure being effective to resist retraction of the screw.

3. In combination, a spindle, a knob mounted on said spindle, a fastening screw threaded in said knob and terminating in a cutting end, a portion of said spindle being mutilated for cooperation with said cutting end whereby said screw when rotated home relatively to said knob is adapted to have its cutting end cut the material of the mutilated portion of the spindle and gradually build up said material into a pressure shoulder applying pressure to said screw and resisting the backward rotation of the screw relatively to said knob.

4. In combination, a spindle having an opening in one surface thereof, a knob mounted on said spindle, a fastening screw threaded in said knob and terminating in a cutting end slightly greater in diameter than the width of the opening, said screw when rotated home relatively to said knob being adapted to have its cutting end cut the material of the spindle from the walls of the opening and gradually build up said material into a pressure shoulder applying pressure to said screw and resisting the backward rotation of the screw relatively to said knob.

5. In combination, a spindle having an opening in one surface thereof, a knob mounted on said spindle, a fastening screw threaded in said knob and terminating in a cutting end slightly greater in diameter than the width of the opening, the end surface of said cutting end being concave to facilitate its cutting the walls of said opening, said screw when rotated home relatively to said knob being adapted to cut the material of the spindle from the walls of the opening and build up said material into a pressure shoulder applied against the concave end surface of said screw and resisting the backward rotation of the screw relatively to said knob.

6. In combination, a spindle having an opening in one surface thereof, a knob mounted on said spindle, a fastening screw threaded in said knob and terminating in an end portion having a peripheral cutting edge slightly greater in diameter than the width of the opening, said screw when rotated home relatively to said knob being adapted to have its peripheral cutting edge cut the material of the spindle from the walls of the opening.

GEORGE E. JOHNSTON.